(12) United States Patent
Kim et al.

(10) Patent No.: US 10,126,532 B2
(45) Date of Patent: Nov. 13, 2018

(54) MOBILE TERMINAL

(71) Applicant: LG ELECTRONICS INC., Seoul (KR)

(72) Inventors: Jongpil Kim, Seoul (KR); Dongjin Lee, Seoul (KR); Sungbum Joo, Seoul (KR); Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 15/015,806

(22) Filed: Feb. 4, 2016

(65) Prior Publication Data

US 2017/0075092 A1 Mar. 16, 2017

(30) Foreign Application Priority Data

Sep. 15, 2015 (KR) .................. 10-2015-0130562

(51) Int. Cl.
 *G02B 13/06* (2006.01)
 *G02B 7/182* (2006.01)
 (Continued)

(52) U.S. Cl.
 CPC ............. *G02B 13/06* (2013.01); *G02B 7/182* (2013.01); *G02B 17/0808* (2013.01); *G02B 17/0816* (2013.01); *G03B 37/04* (2013.01); *G03B 37/06* (2013.01); *G06T 5/50* (2013.01); *H04M 1/0264* (2013.01); *H04N 5/2256* (2013.01); *H04N 5/2257* (2013.01); *H04N 5/2258* (2013.01); *H04N 5/23238* (2013.01); (Continued)

(58) Field of Classification Search
 CPC combination set(s) only.
 See application file for complete search history.

(56) References Cited

U.S. PATENT DOCUMENTS

| 8,730,299 B1 * | 5/2014 | Kozko ................ H04N 5/2254 348/38 |
| 2012/0045100 A1 * | 2/2012 | Ishigami ............... G06T 7/73 382/106 |
| 2015/0103197 A1 * | 4/2015 | Djordjevic ........... G06T 15/205 348/218.1 |

FOREIGN PATENT DOCUMENTS

| EP | 2779628 | 9/2014 |
| GB | 2456334 | 7/2009 |

(Continued)

OTHER PUBLICATIONS

English translation of JP2005283616.*
European Patent Office Application Serial No. 16169652.1, Search Report dated Sep. 14, 2016, 8 pages.

*Primary Examiner* — Janese Duley
(74) *Attorney, Agent, or Firm* — Lee Hong Degerman Kang & Waimey

(57) ABSTRACT

The present invention relates to a mobile terminal, which includes a terminal body, an optical system located in the terminal body and being configured to receive light; a rod located at a side of the optical system; and a curved mirror located at an end portion of the rod, wherein the rod and the curved mirror are positionable between a first state and a second state, wherein in the first state the rod and the curved mirror are relatively closer to the optical system, and in the second state the rod and the curved mirror have been extended outward from the optical system, and wherein the curved mirror reflects omnidirectional light incident on the curved mirror toward the optical system when in the second state.

10 Claims, 19 Drawing Sheets

(51) Int. Cl.
*G02B 17/08* (2006.01)
*G06T 5/50* (2006.01)
*H04N 5/232* (2006.01)
*H04N 5/225* (2006.01)
*H04M 1/02* (2006.01)
*G03B 37/04* (2006.01)
*G03B 37/06* (2006.01)
*H04N 5/33* (2006.01)

(52) U.S. Cl.
CPC ............... *H04N 5/23245* (2013.01); *G06T 2207/10016* (2013.01); *G06T 2207/20221* (2013.01); *H04N 5/332* (2013.01)

(56) References Cited

FOREIGN PATENT DOCUMENTS

| | | |
|---|---|---|
| WO | 2010/019757 | 2/2010 |
| WO | 2011/098760 | 8/2011 |

\* cited by examiner

MOBILE TERMINAL

CROSS-REFERENCE TO RELATED APPLICATION

Pursuant to 35 U.S.C. § 119(a), this application claims the benefit of earlier filing date and right of priority to Korean Application No. 10-2015-0130562, filed on Sep. 15, 2015, the contents of which is incorporated by reference herein in its entirety.

BACKGROUND OF THE INVENTION

1. Field of the Invention

This specification relates to a mobile terminal having a camera allowing for omnidirectional capturing.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Meanwhile, in order to obtain a photo or an image in which every surrounding is recorded by one-shot image capture, a user should inconveniently take such photo or image by turning centering on one point. In this instance, when using a camera with a wide field of view (FOV) in a panorama mode, a process of merging images captured by at least two optical systems, respectively, into one image is carried out. As one example, when a camera (optical system) for capturing a front side and a camera (optical system) for capturing a rear side are provided at front and rear surfaces of the mobile terminal, respectively, an image obtained by the front camera and an image obtained by the rear camera should be merged to obtain an image similar to an image obtained by 360° capturing.

If such front and rear images are simply connected and merged, shadows are generated at both ends of the merged image or an image loss may be caused during image alignment.

Therefore, there is a requirement for a mobile terminal having cameras (optical systems) capable of omnidirectionally capturing images, without causing an image loss during image merging.

SUMMARY OF THE INVENTION

Therefore, an aspect of the detailed description is to provide a mobile terminal, capable of fully recording user's surroundings by one-shot image capture.

To achieve these and other advantages and in accordance with the purpose of this specification, as embodied and broadly described herein, there is provided a mobile terminal including a terminal body; an optical system located in the terminal body and being configured to receive light; a rod located at a side of the optical system; and a curved mirror located at an end portion of the rod, wherein the rod and the curved mirror are positionable between a first state and a second state, wherein in the first state the rod and the curved mirror are relatively closer to the optical system, and in the second state the rod and the curved mirror have been extended outward from the optical system, and wherein the curved mirror reflects omnidirectional light incident on the curved mirror toward the optical system when in the second state.

In accordance with one aspect of the present invention, the curved mirror may include a hemispherical shape that is convex toward the optical system.

In accordance with one aspect of the present invention, the curved mirror may include a first curved mirror located relatively closer to the optical system and having a hemispherical shape that is convex toward an exterior of the terminal body; and a second curved mirror located relatively further from the optical system and spaced at a distance from the first curved mirror and reflecting light that was reflected from the first curved mirror to the optical system.

In accordance with one aspect of the present invention, the first curved mirror may be shaped to define a hole formed through a central portion thereof, and wherein at least a portion of the optical system is located within the hole.

In accordance with one aspect of the present invention, the rod may be an antenna rod.

In accordance with one aspect of the present invention, the mobile terminal may further include a controller configured to activate a general camera mode during the first state, and switch from the general camera mode to an omnidirectional capturing mode in response to switching from the first state to the second state.

In accordance with one aspect of the present invention, a size of the curved mirror and a spaced distance between the curved mirror and a center of the optical system may be varied according to a range of a field of view (FOV) of the optical system.

In accordance with one aspect of the present invention, the curved mirror may be positionable along a lengthwise direction of the terminal body or positionable in an upwardly inclined manner in the lengthwise direction of the terminal body, and wherein the curved mirror may be located on an optical axis of the optical system to permit the curved mirror to be positionable along the optical axis of the optical system.

In accordance with one aspect of the present invention, the mobile terminal may further include a sub curved mirror located between the curved mirror and the optical system when the curved mirror is pulled by being deviated from the optical axis of the optical system, the sub curved mirror reflecting light reflected from the curved mirror toward the optical axis of the optical system.

In accordance with another exemplary embodiment of the present invention, there is provided a mobile terminal including a terminal body, an optical system located in the terminal body and being configured to omnidirectionally capture surroundings of the terminal body, wherein the optical system may include a first optical system capturing light received from a first direction, and a second optical system capturing light received from a second direction opposite to the first direction, wherein the first optical system and the second optical systems each may have a field of view (FOV) over 180°, and wherein the omnidirectional capturing may be performed by merging a first image captured by the first optical system and a second image captured by the second optical system.

In accordance with one aspect of the present invention, the first and second optical systems may have a symmetric structure in which a first optical axis of the first optical system and a second optical axis of the second optical system may be aligned, or an asymmetric structure in which the first optical axis and the second optical axis may be not aligned with each other.

In accordance with one aspect of the present invention, the first and second optical systems may be arranged in the symmetric structure, wherein the mobile terminal may further include a rotatable curved mirror located between the first optical system and the second optical system; and an image sensor located at least at one of an upper portion or a lower portion of the curved mirror.

In accordance with one aspect of the present invention, the first optical system and the second optical system may be located at different sides of the terminal body.

In accordance with one aspect of the present invention, the merging of the first image and the second image may include performing an optical axis alignment for the first image and the second images by moving the first image and the second image toward a third axis by predetermined distances, wherein the third axis may correspond to a middle point between the first optical axis and the second optical axis when the first optical system and the second optical system are arranged in the asymmetric structure.

In accordance with one aspect of the present invention, partial areas of both end portions of the first image and the second image may be omitted, the partial areas approaching the third axis due to image movement during the optical axis alignment.

In accordance with one aspect of the present invention, the first image and the second image may be merged by combining a plurality of first sub images and second sub images captured in a panorama mode, and wherein at least a partial area of overlapped areas between the plurality of first and second sub images may be generated by merging overlapped areas between the adjacent sub images.

In accordance with one aspect of the present invention, the mobile terminal may further include a first display configured to display the first image and the second image; and a second display configured to output a partial area of what may be displayed at the first display in an enlarged manner, the partial area being indicated by a guide.

In accordance with one aspect of the present invention, snap shot capturing may be performed while previewing the partial area displayed on the second display.

In accordance with one aspect of the present invention, the terminal body may further include at least one of a proximity light sensor, a laser sensor, a gyro sensor, or an acceleration sensor, configured to sense a mounted or moving direction of the terminal body, so as to block a power supply to one of the first optical system or the second optical system.

Description will be given of effects of a mobile terminal and a control method thereof according to the present invention, as follows.

In accordance with at least one of exemplary embodiments disclosed herein, 360° capturing can be allowed through one-shot image capture, whereby a user can fully record his or her surroundings, and be free from inconvenience in capturing an image in a turning manner.

In accordance with at least one of exemplary embodiments disclosed herein, one experience can be repetitively reproduced to get extraordinary experiences at various view points.

In addition, in accordance with at least one of exemplary embodiments disclosed herein, by watching others' experiences through a virtual reality (VR) apparatus, new experiences can be obtained.

In accordance with at least one of exemplary embodiments disclosed herein, an optical axis alignment may be carried out upon merging a plurality of images captured in both directions, thereby preventing a generation of shadow areas at both ends of each image and an image loss.

In accordance with at least one of exemplary embodiments disclosed herein, mounted states and moving directions of optical systems can be sensed by employing sensors, thereby turning off an unnecessary optical system.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
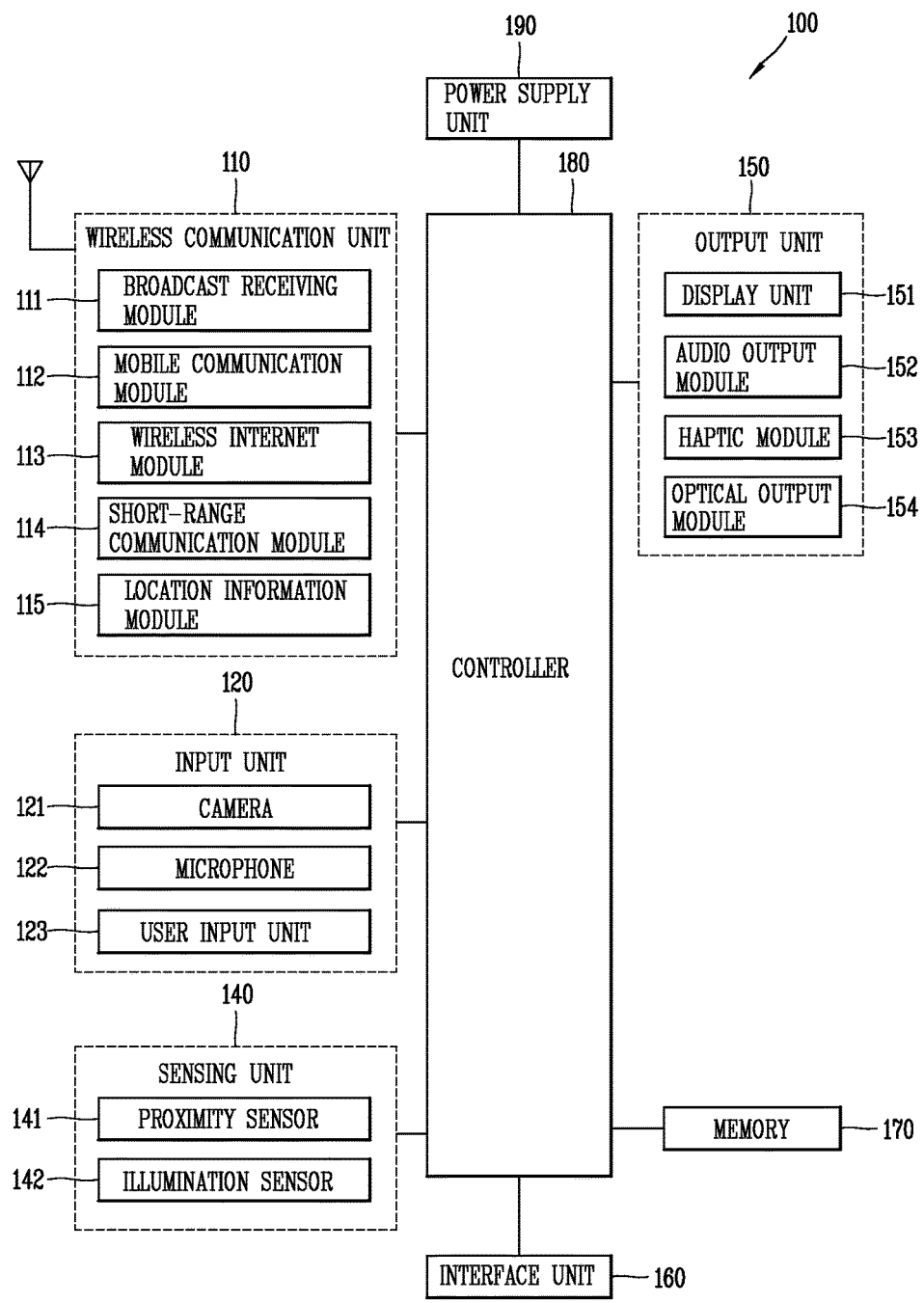
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1B:
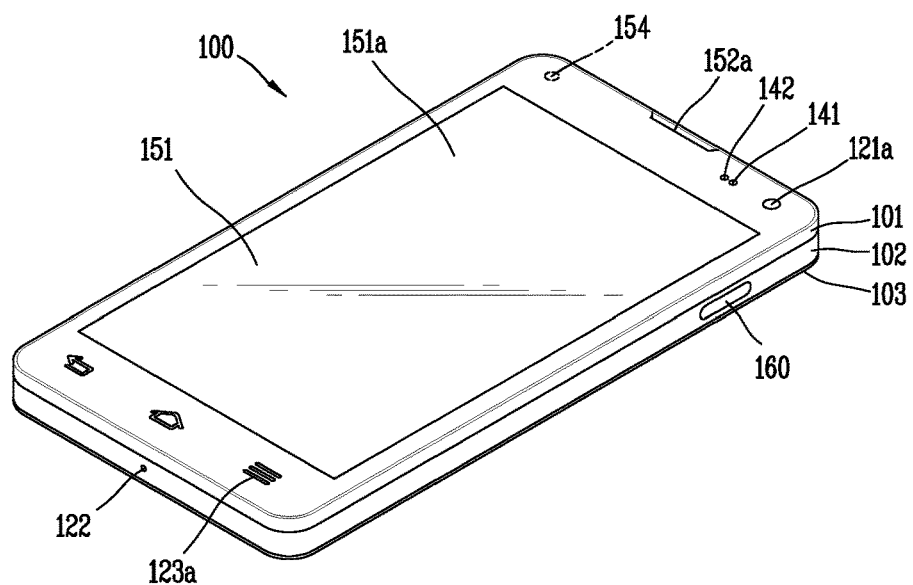
FIGS. 1B and 1C are conceptual views illustrating one example of the mobile terminal, viewed from different directions.
Figure 1C:
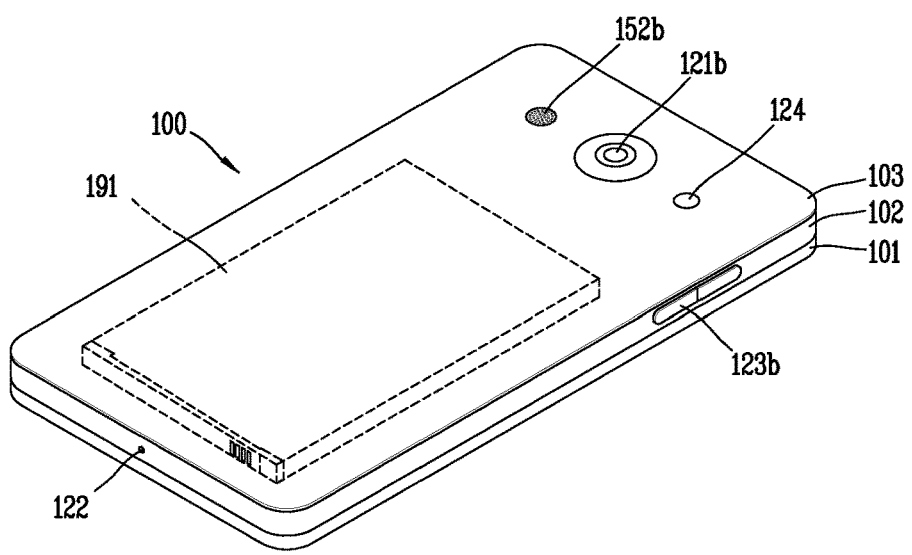

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not illustrated) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 may be configured to receive user's voice and other sounds. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an 'array camera.' When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments associated with a control method which can be implemented in the mobile terminal having such configuration will be described with reference to the accompanying drawings. It is obvious to those skilled in the art that the present disclosure can be specified into other particular forms without departing from the spirit and essential features of the present disclosure.

Figure 2:
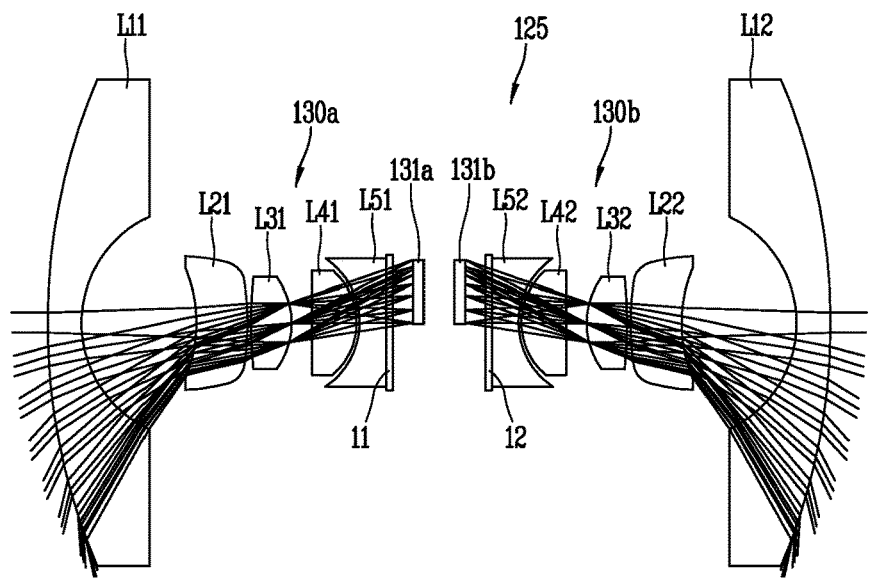
FIG. 2 is an arrangement view of lenses of a wide angle camera module in accordance with one exemplary embodiment of the present invention.

FIG. 2 is an arrangement view of lenses of a wide angle camera module 125 for bidirectional capturing in accordance with the present invention. As illustrated in FIG. 2, a plurality of lenses may be arranged in a symmetrical manner for bidirectional capturing. The camera module 125 may include a first optical system 130a that captures a first direction (e.g., capturing a front side), and a second optical system 130b that captures a second direction (e.g., capturing a rear side), which is opposite to the first direction. The first optical system 130a and the second optical system 130b may be provided with the same lenses. Light (or an optical signal) that comes in the first direction may be converted into an electric signal by a first image sensor 131a and light (or an optical signal) that comes in the second direction may be converted into an electric signal by a second image sensor 131b. To this end, the first and second image sensors 131a and 131b may be arranged at the innermost sides of the first optical system 130a and the second optical system 130b, respectively.

The first and second optical systems 130a and 130b may be provided with a plurality of lenses each having one surface or both surfaces in a convex or concave shape. FIG. 2 illustrates that first to fifth lenses L11, L12, L21, L22, L31, L32, L41, L42, L51 and L52 are arranged from outside to inside, the image sensors 131a and 131b are arranged at each one side of the fifth lenses L51 and L52, and infrared cut-off (IR) filters 11 and 12 which cut off infrared ray except for visible ray are disposed between the image sensors 131a and 131b and the fifth lenses L51 and L52.

In this manner, the first and second optical systems 130a and 130b are apparatuses, each of which is provided with a plurality of lenses arranged in series along an optical axis and configured to collect a large quantity of light from one point of a subject to be captured and refract the collected light to be converged on a single point. In this instance, the light straightly incident from the one point is converged on the single point through the lenses, and thus generate one image. In this instance, a distance between the image sensor 131a, 131b and the lens, at which the image is generated, may be referred to as a focal length.

The first to fifth lenses L11, L12, L21, L22, L31, L32, L41, L42, L51 and L52 may be components equipped for a case where a field of view (FOV) is over 180°. If an optical system supports capturing in a FOV range over 180°, an arrangement order of those lenses and refractive power of each of the lenses may not specifically be limited. In order to set the field of view (FOV) of each of the first and second optical systems 130a and 130b to 180° or more, the refractive power of the first to fifth lenses 11, L12, L21, L22, L31, L32, L41, L42, L51 and L52 may have a combination of positive (+) or negative (−) values.

One exemplary embodiment of the present invention may not specifically limit the refractive power of each of the first to fifth lenses 11, L12, L21, L22, L31, L32, L41, L42, L51 and L52, and detailed description thereof will be omitted.

Figure 3:
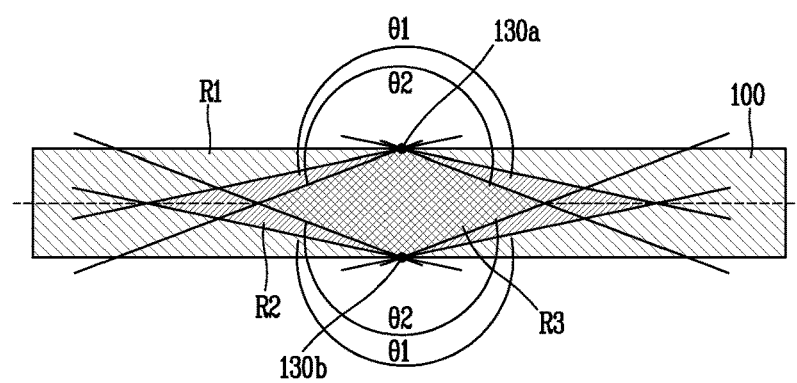
FIG. 3 is a conceptual view illustrating fields of view (FOVs) upon capturing front and rear sides by using the wide angle camera module according to FIG. 2.

FIG. 3 is a conceptual view of FOVs in case where the camera module 125 illustrated in FIG. 2 captures front and rear sides in a mounted state in the mobile terminal. Referring to FIG. 3, when the FOV of each optical system is 180°, it may be difficult to ensure an FOV as wide as a range corresponding to a thickness of the mobile terminal 100. That is, a shadow as great as a portion corresponding to the thickness of the mobile terminal may be generated.

Ignoring the thickness of the mobile terminal 100, if an FOV of each optical system is θ1, an area R1 may additionally be captured and thus a shadow may be reduced by the area R1. If the FOV is θ2 greater than θ1, an area R2 may additionally be captured and thus the shadow may be reduced by the area R2. An area R3 may be a non-captured area in both of the FOVs of θ1 and θ2. That is, the shadow area may be reduced when the FOVs of the first and second optical systems 130a and 130b increases. In this instance, FIG. 3 exemplarily illustrates that the first and second optical systems 130a and 130b have the same optical axis.

The shadow area is an element interfering with 360°-capturing (or capturing in all directions) of user's surroundings. To overcome this, an optical system with an FOV greater than 180° has been developed. As illustrated in FIG. 3, the shadow area is reduced in response to an increase in the FOV. However, even such optical system with the FOV over 180° has a limit in capturing a portion corresponding to the mobile terminal 100.

Figure 4A:
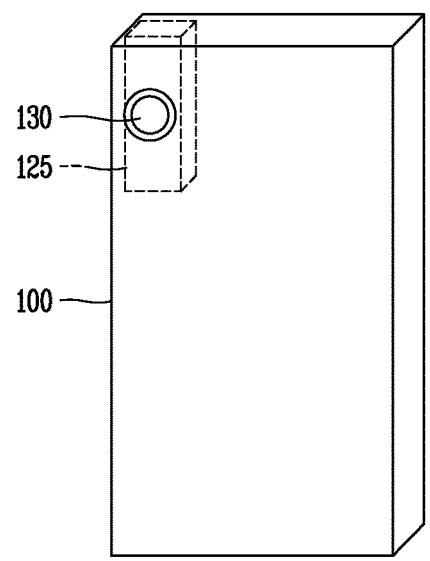
FIG. 4A is a perspective view of a mobile terminal having optical systems provided at both sides of the mobile terminal in accordance with one exemplary embodiment of the present invention.
Figure 4B:
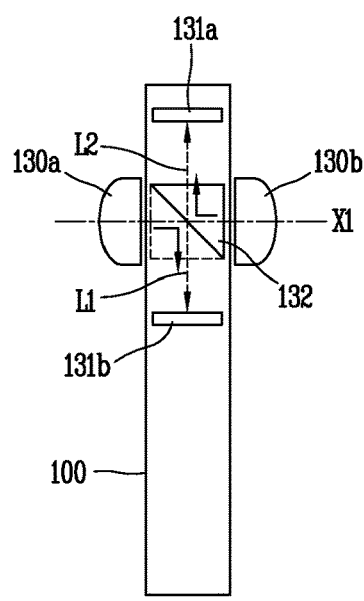
FIG. 4B is a conceptual view illustrating paths of light when a mobile terminal includes two optical systems protruding from both surfaces thereof and two image sensors, in accordance with one exemplary embodiment of the present invention.
Figure 4C:
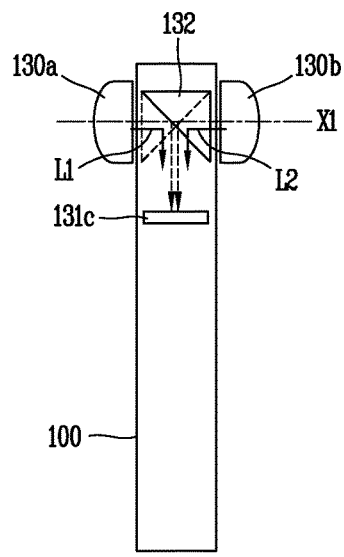
FIG. 4C is a conceptual view illustrating paths of light when a mobile terminal includes two optical systems protruding from both surfaces thereof and one image sensor, in accordance with one exemplary embodiment of the present invention.

FIG. 4A is a perspective view of a mobile terminal 100 having a camera module 125 protruding to both surfaces in accordance with one exemplary embodiment of the present invention. FIG. 4B is a conceptual view illustrating paths of light in case where the mobile terminal 100 includes two optical systems 130a and 130b protruding to both surfaces thereof, and two image sensors 131a and 131b. FIG. 4C is a conceptual view illustrating paths of light in case where the mobile terminal 100 includes the two optical systems 130a and 130b protruding to the both surfaces thereof and one image sensor 131c.

Figure 4D:
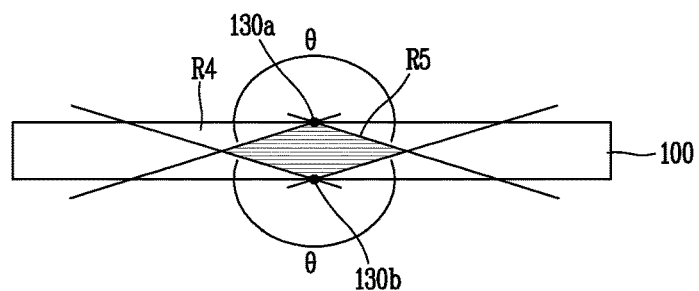
FIG. 4D is a view illustrating a state that a first optical system and a second optical system of FIG. 4B are arranged at a center of the mobile terminal.
Figure 4E:
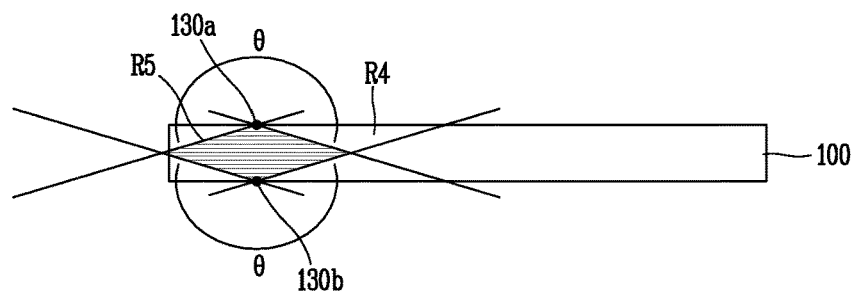
FIG. 4E is a view illustrating a state that the first optical system and the second optical system of FIG. 4B are arranged at one end portion of the mobile terminal.

Also, FIG. 4D is a view illustrating a state that the first optical system 130a and the second optical system 130b of FIG. 4B are arranged at a center of the mobile terminal 100, and FIG. 4E is a view illustrating a state that the first optical system 130a and the second optical system 130b are arranged at one end portion of the mobile terminal 100.

In this instance, FIG. 4A is a schematic perspective view of the mobile terminal 100, and FIGS. 4B and 4C are schematic lateral views of the mobile terminal 100. The first optical system 130a and the second optical system 130b may be optical systems capable of capturing a wide view over 180°.

As illustrated in FIGS. 4A to 4C, it may be noticed that the first optical system 130a and the second optical system 130b externally protrude to both side surfaces of the mobile terminal 100. FIGS. 4A to 4C illustrate that the first and second optical systems 130a and 130b are arranged at symmetrical positions to have the same optical axis X1. In this instance, FIG. 4B illustrates a reflecting mirror 132 which is rotatable are provided between the first and second optical systems 130a and 130b, and the first and second image sensors 131a and 131b are arranged at positions perpendicular to the optical axis X1. That is, the first and second image sensors 131a and 131b may be arranged respectively at upper and lower sides of the camera module 125 or the first and second optical systems 130a and 130b.

FIG. 4C is the same as FIG. 4B except for employing a single image sensor 131c. In this instance, the reflecting mirror 132 may be rotatable by 60 times per second, which allows for instantaneously capturing front and rear sides at the same time.

Referring back to FIG. 4B, in case of capturing a front side using the first optical system 130a and a rear side using the second optical system 130b, when a capture button is pressed, light L1 that is incident into the first optical system 130a from the front side may be reflected by the reflecting mirror 132 and converted into an electric signal by the lower first image sensor 131a. Afterwards, the reflecting mirror 132 may be instantaneously rotated to reflect light L2 that is incident into the second optical system 130b. The light L2 may accordingly be converted into an electric signal by the second image sensor 131b. In this instance, since the rotation speed of the reflecting mirror 132 is fast, the front and rear sides can be captured at almost the same time section. In this instance, the reflecting mirror 132 for reflecting the light L1 coming toward the first optical system 130a is indicated by a solid line and the reflecting mirror 132 for reflecting the light L2 coming in the second optical system 130b is indicated by a dotted line.

Meanwhile, referring to FIG. 4C, in case of simultaneously capturing front and rear sides using the first and second optical systems 130a and 130b, when a capture button is pressed, light that is incident into the first optical system 130a from the front side may be reflected by the reflecting mirror 132 and primarily converted into an electric signal by the common image sensor 131c. Afterwards, the reflecting mirror 132 may be rotated to reflect light that is incident into the second optical system 130b. Then, the reflected light may be secondarily converted into an electric signal by the common image sensor 131c. Accordingly, the front and rear sides can be captured. Arrows L1 and L2 illustrated in FIG. 4C indicate paths of the light coming in the first and second optical systems 130a and 130b.

That is, in FIG. 4C, such light L1 and L2 coming toward the first and second optical systems 130a and 130b may be converted into the electric signals by the same common image sensor 131c. In more detail, the light L1 incident into the first optical system 130a may be reflected by the reflecting mirror 132 and converted into the electric signal by the common image sensor 131c. Afterwards, the reflecting mirror 132 may be rotated. The light L2 incident into the second optical system 130b may then be reflected by the rotated reflecting mirror 132 and converted into the electric signal by the common image sensor 131c. Here, similar to FIG. 4B, the reflecting mirror 132 for reflecting the light L1 coming in the first optical system 130a is indicated by the solid line, and the reflecting mirror for reflecting the light L2 coming in the second optical system 130b is indicated by the dotted line.

As illustrated in FIG. 4C, with the design of the single image sensor 131c, the camera module 125 having the first and second optical systems 130a and 130b can have more reduced size and/or thickness.

As illustrated in FIGS. 4A to 4C, if the first and second optical systems 130a and 130b protrude to the outside of the mobile terminal 100, it may cause inconvenience in use. Therefore, the first and second optical systems 130a and 130b may preferably be located in the mobile terminal 100. In this instance, it may be advantageous to reduce a number of the image sensors, as illustrated in FIG. 4C.

Referring to FIG. 4D, in case of arranging the first and second optical systems 130a and 130b at a center, other than the end portion, of the mobile terminal 100, a shadow area may be reduced in response to an increase in an FOV, as illustrated in FIG. 3. However, even though the FOV increases, a minimization of the shadow area may be limited due to a thickness of the mobile terminal 100. In this instance, when the FOV of each optical system is θ, areas R4 and R5 may not be captured by the first and second optical systems 130a and 130b. This may result from a block portion by the mobile terminal 100. That is, the areas R4 and R5 may be the non-captured shadow areas.

On the other hand, referring to FIG. 4E, when the first and second optical systems 130a and 130b are formed at both end portions of the mobile terminal 100, wider areas may be captured by the first and second optical systems 130a and 130b. In more detail, a right area captured by the first and second optical systems 130a and 130b is the same as that illustrated in FIG. 4D, but a left area captured by the first and second optical systems 130a and 130b may be wider than that illustrated in FIG. 4D.

That is, the shadow area R5 is almost the same as that in FIG. 4D, but an outer area of the end portion of the mobile terminal 100, namely, the shadow area R4 formed at the left side of the mobile terminal 100 may be reduced. In other words, approximately half of the shadow formed by the first and second optical systems 130a and 130b can be reduced.

In order to obtain an effect equal to 360° capturing by using wide view cameras each having the FOV exceeding 180°, a captured image of a front side and a captured image of a rear side should be merged (fused, combined) with each other.

Figure 5A:
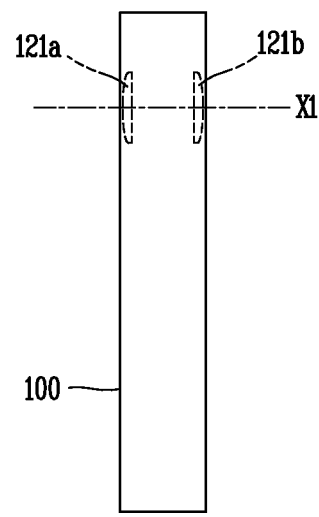
FIG. 5A is a view illustrating a mobile terminal having a front camera and a rear camera symmetrically disposed therein.
Figure 5B:
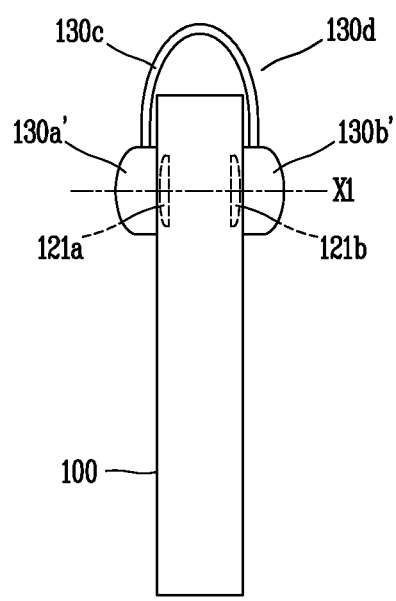
FIG. 5B is a view illustrating a state that an optical system is attached onto a mobile terminal, in accordance with one exemplary embodiment of the present invention.
Figure 5C:
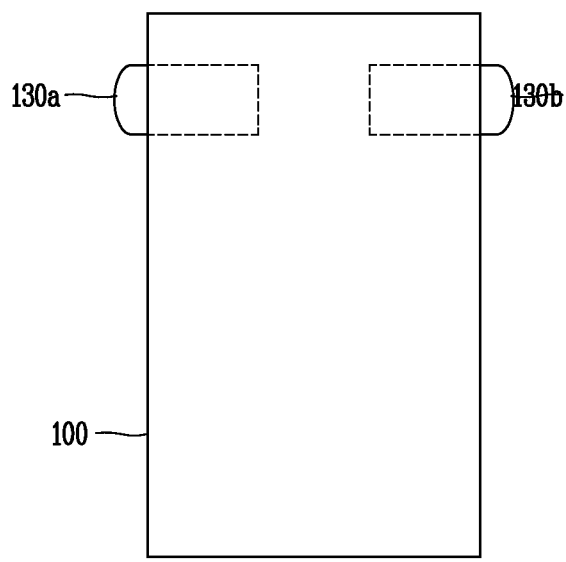
FIG. 5C is a view illustrating that first and second optical systems are exposed to both sides of a mobile terminal, in accordance with one exemplary embodiment of the present invention.

Meanwhile, FIG. 5A illustrates a mobile terminal in which a front camera and a rear camera are arranged symmetric to each other, FIG. 5B illustrates a state that optical systems are attached to the mobile terminal in accordance with one exemplary embodiment, and FIG. 5C illustrates that first and second optical systems are exposed to both sides of the mobile terminal in accordance with one exemplary embodiment.

As illustrated in FIG. 5B, when a front camera 121a and a rear camera 121b are provided in front and rear surfaces of the mobile terminal, respectively, an optical member 130d may be provided upon desiring to desiring to omnidirectionally capture surroundings. The optical member 130d may include a first optical system 130a' and a second optical system 130b' provided as accessories to cover the front camera 121a and the rear camera 121b, respectively, and a connection member 130c connecting the first optical system 130a' and the second optical system 130b'. For example, the mobile terminal 100 may ordinarily be used in a general camera mode. When desiring to perform the omnidirectional capturing, the optical member 130d may be attached to cover the front camera 121a and the rear camera 121b of the mobile terminal 100 thereby facilitating the omnidirectional capturing. Afterwards, upon completion of the omnidirectional capturing, the optical member 130d may be detached. In this instance, each of the first optical system 130a' and the second optical system 130b' of the optical member 130d may implement a wide view camera, which can capture an area over 180° by combination with lenses of the front camera 121a and the rear camera 121b.

Also, referring to FIG. 5C, as aforementioned with reference to FIG. 4E, when the optical system 130 is provided at the end portion, other than a center, of the mobile terminal 100, the characteristic of ensuring the wider FOV can be used. That is, as illustrated in FIG. 5C, when front and rear sides of the mobile terminal 100 are captured by providing the first and second optical systems 130a and 130b at side surfaces of the mobile terminal 100, a shadow area can be minimized. In this instance, when the first and second optical systems 130a and 130b are provided at the front surface and the rear surface of the mobile terminal 100, the mobile terminal 100 may occupy a great part of a captured area. On the other hand, when the first and second optical systems 130a and 130b are provided at both side surfaces of the mobile terminal 100, the mobile terminal 100 may occupy a smaller part of a captured area. Here, FIG. 5C is a front view of the mobile terminal 100.

Figure 6A:
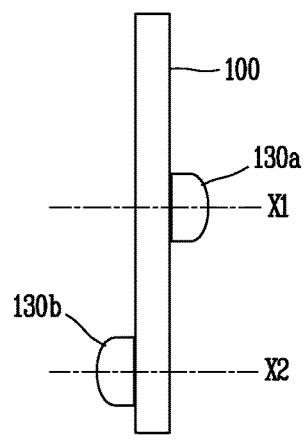
FIG. 6A is a view illustrating a mobile terminal having a pair of optical systems with different optical axes, in accordance with one exemplary embodiment of the present invention.
Figure 6B:
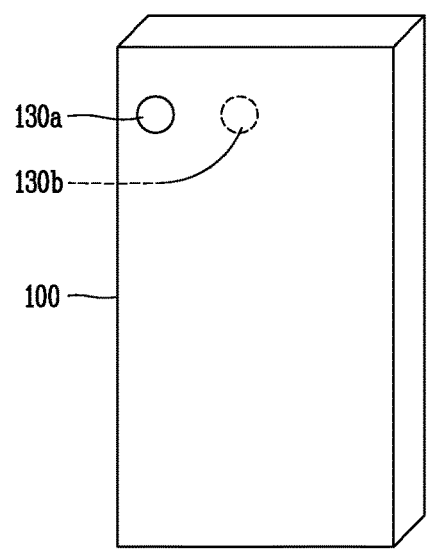
FIGS. 6B and 6C are front perspective view of the mobile terminal related to FIG. 6A.
Figure 6C:
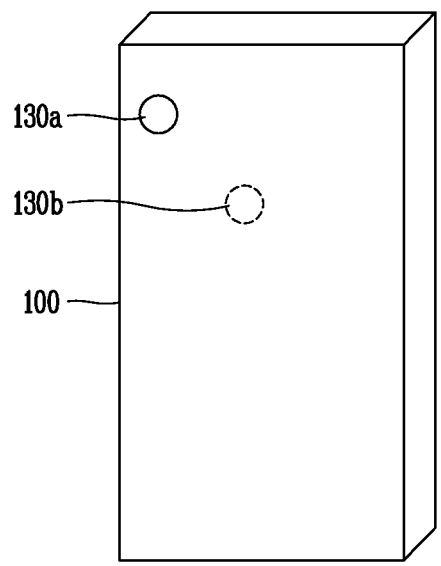

FIG. 6A illustrates a mobile terminal having a pair of optical systems with different optical axes, and FIGS. 6B and 6C are front perspective views of the mobile terminal related to FIG. 6A. Here, FIG. 6B illustrates that a pair of optical systems is formed at front and rear surfaces of the mobile terminal 100 at the same height, and FIG. 6C illustrates that a pair of optical systems are formed at the front surface and the rear surface of the mobile terminal 100 at different heights.

As illustrated in FIGS. 4A to 4E, when the first and second optical systems 130a and 130b are arranged opposite to each other in a symmetric structure, a separate optical axis alignment may not be required. However, as illustrated in FIGS. 6A to 6C, when the first and second optical systems 130a and 130b are arranged in an asymmetric structure, the optical axis alignment may sometimes be required in order to obtain an effect equal to 360° capturing.

The first and second optical systems 130a and 130b illustrated in FIGS. 4A to 4E have thicknesses, respectively, and thus a thickness of the mobile terminal 100 may increase when the first and second optical systems 130a and 130b are mounted to the mobile terminal 100 which is thin in thickness. To solve this, one exemplary embodiment of the present invention illustrates a case that the first and second optical systems 130a and 130b are mounted at positions asymmetric to each other, other than symmetric positions. Hereinafter, description will be generally given of the asymmetric structure of the first and second optical systems 130a and 130b. In relation to this, description will first be given with reference to FIGS. 7A to 7C. For a symmetric structure in which the first and second optical systems 130a and 130b have the same optical axis, the optical axis alignment which will be explained hereinafter is not required.

Figure 7A:
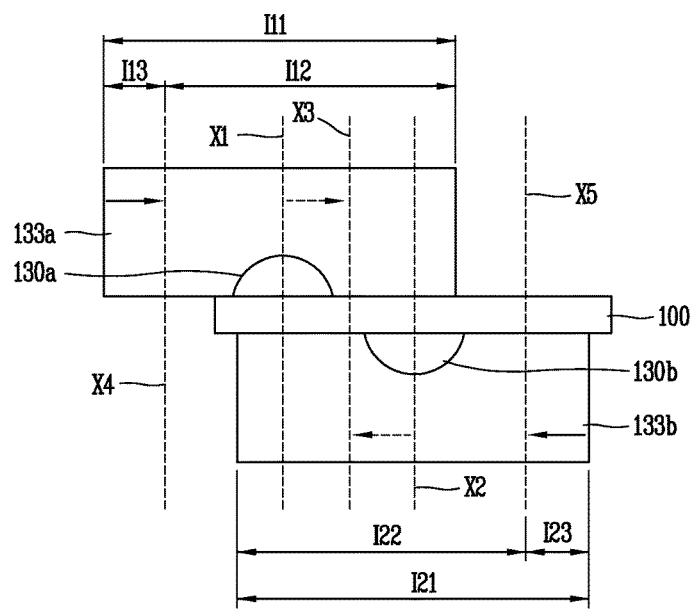
FIGS. 7A to 7C are conceptual views illustrating image merging in a mobile terminal having a pair of optical systems in an asymmetric structure, in accordance with one exemplary embodiment of the present invention.
Figure 7B:
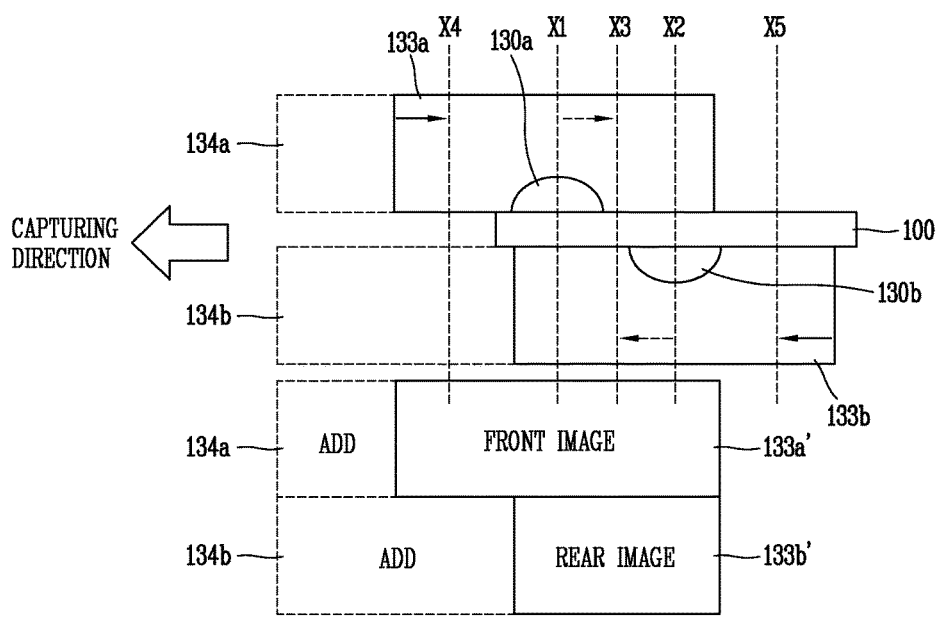
Figure 7C:
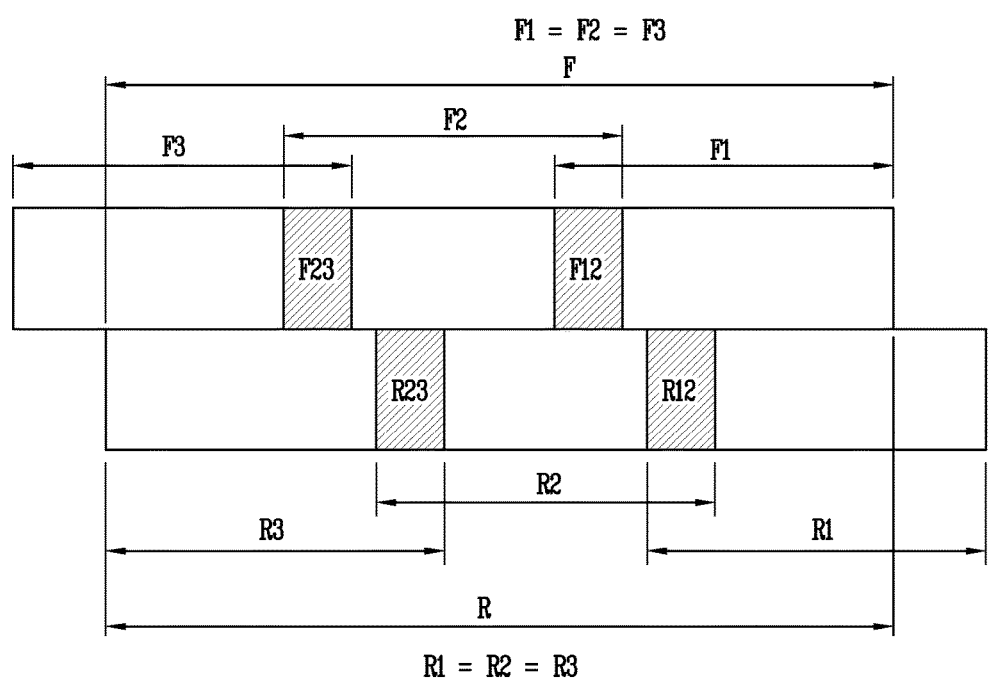

FIGS. 7A to 7C are views illustrating image merging in a mobile terminal having a pair of optical systems arranged in an asymmetric structure in accordance with one exemplary embodiment of the present invention. FIG. 7A is a conceptual view illustrating an optical axis alignment in case of performing one shot image capture for each of front and rear sides, FIG. 7B is a conceptual view illustrating an optical axis alignment in case of performing two shots (two-time shot), and FIG. 7C is a conceptual view illustrating an optical axis alignment in case of performing multi-shot image captures more than two times.

First, referring to FIG. 7A, when the first and second optical systems 130a and 130b have different optical axes, a central axis X1 of a front image 133a and a central axis X2 of a rear image 133b are different from each other at the same (equal) time. In this instance, for the sake of explanation, the central axis X1 of the front image 133a is referred to as a first optical axis and the central axis X2 of the rear image 133b is referred to as a second optical axis. Also, the front image 133a is referred to as a first image, and the second image 133b is referred to as a second image.

In order to obtain an effect equal to capturing a background in all directions around the mobile terminal 100, positions of the first optical axis X1 and the second optical axis X2 should be aligned with each other. To this end, as illustrated in FIG. 7A, the first image 133a should be moved by a predetermined distance I13, and the second image 133b should be moved by a distance I23, which is equal to the predetermined distance I13. In this instance, the first and second optical axes X1 and X3 are referred to as central axes, and an optical axis at which the first and second optical axes X1 and X2 are aligned with each other is referred to as a third optical axis X3. Here, both end portions of the first and second images 133a and 133b may be cut by the predetermined areas I13 and I23 which are getting close to the third optical axis X3 due to the image movements. That is, to merge the first and second images 133a and 133b, partial areas I13 and I23 of areas, which are far away from the third optical axis X3, of both ends of the first and second images 133a and 133b may be cut.

For example, in FIG. 7A, in order to merge the first and second images 133a and 133b by optical axis alignment, a left end of the first image 133a should be moved to right up to a fourth axis X4. In this instance, the area I13 of the left end of the first image 133a may have the same size as an area between the first optical axis X1 and the third optical axis X3, and the partial area I13 of the left end may be cut by the alignment of the first optical axis X1. Therefore, a partial area I12 of an entire area I11 of the first image 133a may be left.

Also, the second image 133b should be moved to left up to a fifth axis X5 for optical axis alignment. The partial area I23 of a right end of the second image 133b may have the same size as an area between the second optical axis X2 and the third optical axis X3, and the partial area I23 of the right end may be cut by the alignment of the second optical axis X2. Consequently, the partial area I22 of an entire area I21 of the second image 133b may be left. This may allow for obtaining an effect equal to capturing an image at 360°. However, because the both end areas I13 and I23 of the first and second images 133a and 133b are cut, an effect equal to fully capturing an image at 360° may not be obtained in some cases. To solve this problem, a two-shot image capture may be carried out, which will be described with reference to FIG. 7B.

FIG. 7A illustrates a one-shot image capture using each of the first and second optical systems 130a and 130b, and FIG. 7B illustrates a two-shot image capture using each of the first and second optical systems 130a and 130b. In this instance, the two-shot image capture may not always refer to pressing a camera shutter two times, but may also refer to two shots in a panorama mode. For example, upon capturing in the panorama mode, a user turns at his position at a predetermined speed, with pressing a camera shutter, to take his or her surroundings. In this instance, the camera module performs capturing, similar to capturing with pressing the shutter at a preset time interval. When the user turns with pressing the shutter, a plurality of images may be taken automatically, and those images are merged when viewed to the user. In this instance, if the user turns at a speed faster than the preset speed to take the surroundings, image merging may not be smoothly carried out.

That is, FIG. 7A illustrates the one-shot image capture for each of front and rear sides. This instance may fail to fully reflect the front and rear sides. To solve this, a panorama mode may be used.

FIG. 7B is a view illustrating merging of images captured in the panorama mode.

In the panorama mode, the first and second optical systems 130a and 130b perform capturing while moving along one direction. Areas of images 134a and 134b which are newly added to the first and second images 133a and 133b along the capturing direction may be different. FIG. 7B illustrates that the added images 134a and 134b are connected without carrying out the optical axis alignment to the first and second images 133a and 133b, and then viewed to a user in the panorama mode.

As illustrated in FIG. 7B, during capturing along a direction indicated by arrows, the first added image 134a added to a first image 133a' is connected directly to a left end of the first image 133a', and a second added image 134b added to a second image 133b' may be connected directly to a right end of the second image 133b'. In this instance, an area of the first added image 134a may be smaller than an area of the second added area 134b. This may result from that the first optical axis X1 is captured closer to the capturing direction than the second optical axis X2. Therefore, when the capturing direction is opposite to that illustrated in FIG. 7B, the area of the second add image 134b added to the second image 133b' may be smaller than the area of the first added image 134a added to the first image 133a'. Here, the front images 134a, 133a' and the rear images 134*b*, 133*b*' which are viewed to the user are illustrated at a lower portion of FIG. 7B.

Also, for capturing both of the front and rear sides in the panorama mode, since the first and second optical systems 130*a* and 130*b* have the different optical axes X1 and X2, as illustrated in FIG. 7A, the optical axes of the first and second optical systems 130*a* and 130*b* may be aligned with each other. To this end, as illustrated at an upper portion of FIG. 7B, the first and second optical axes X1 and X2 may be moved up to the third optical axis X3 for image merging. This will be explained with reference to FIG. 7C.

Meanwhile, when performing an image capture using a wide view camera, image distortion at both ends of the image may increase as the FOV (or a viewing angle) increases. That is, a captured image looks large and is less distorted at a central portion thereof, but looks small and is more distorted toward both end portions of the captured image due to an increased image compression ratio. For example, screen distortion may be caused near a boundary between the first image 133*a*' and the first added image 134*a*. To solve this problem, a method of capturing a plurality of images by using a panorama function and interpolating (fusing, merging) the captured images is proposed in one exemplary embodiment of the present invention.

FIG. 7C is a view illustrating a method of merging images during capturing in a panorama mode in accordance with one exemplary embodiment. Hereinafter, description will generally be given of capturing front and rear sides using the first and second optical systems 130*a* and 130*b*, in a manner of moving (or turning) along a left direction, with reference to FIG. 7C. In this instance, images captured by the first optical system 130*a* sequentially refer to a first front image F1, a second front image F2 and a third front image F3, and images captured by the second optical system 130*b* sequentially refer to a first rear image R1, a second rear image R2 and a third rear image R3. Here, the first to third front images F1, F2 and F3 may have areas of the same size, and the first to rear images R1, R2 and R3 may have areas of the same size.

Hereinafter, a merging method a front image F will first be described. During capturing using the first optical system 130*a* along a left direction, the first to third front images F1, F2 and F3 may be obtained. In this instance, the first front image F1 may be an image captured by a first shot, the second front image F2 may be an image captured by a second shot, and the third front image F3 may be an image captured by a third shot. Here, the first to third front images F1, F2 and F3 may be understood as sub images for generating the front image F.

Also, the first to third shots, as aforementioned, may not only refer to directly pressing a shutter, but also refer to automatically capturing images at a preset time interval in the panorama mode. The following description will be given of the latter.

FIG. 7C illustrates three continuously-captured images, and the first to third images F1, F2 and F3 may be captured in a manner that partial areas are overlapped. In this instance, an overlapped area between the first front image F1 and the second front image F2 may be referred to as a first front overlapped image F12, and an overlapped area between the second front image F2 and the third front image F3 may be referred to as a second front overlapped image F23. The front image F may preferably be obtained by merging the first to third front images F1, F2 and F3 in a manner of cutting off a partial area of both end portions of each of the first to third front images F1, F2 and F3. As aforementioned, since both ends of an image captured with one shot exhibit extreme image distortion, the images should be connected to adjacent images by removing such distorted end portions to obtain a merged image with less distortion.

In this instance, the first front overlapped image F12 may be obtained by appropriately merging a left end area of the first front image F1 and a right end area of the second front image F2. Similar to this, the second front overlapped image F23 may be obtained by appropriately merging a left end area of the second front image F2 and a right end area of the third front image F3. The thusly-merged first and second front overlapped images F12 and F23 may then be connected by interpolating into the overlapped areas of the first to third front images F1, F2 and F3, thereby obtaining the front image F constructed by images with better image qualities.

This may be understood in the same vein as the optical axis alignment illustrated in FIG. 7A. That is, the cutoff area I13 in FIG. 7A may be understood as corresponding to the first front overlapped image F12. Also, the cutoff area I23 in FIG. 7A may be understood as corresponding to the first rear overlapped image R12 which will be explained hereinafter.

A rear image R may also be obtained in a similar merging method to the front image F. That is, during capturing using the second optical system 130*b* along a left direction, the first to third rear images R1, R2 and R3 may be obtained. In this instance, the first rear image R1 may be an image captured by a first shot, the second rear image R2 may be an image captured by a second shot, and the third rear image R3 may be an image captured by a third shot. In this instance, the first to third rear images R1, R2 and R3 may be understood as sub images for generating the rear image R.

Also, the first to third shots, as aforementioned, may not only refer to directly pressing a shutter, but also refer to automatically capturing images at a preset time interval in the panorama mode. The following description will be given of the latter.

The first to third rear images R1, R2 and R3 may be captured in a manner that partial areas are overlapped. In this instance, an overlapped area between the first rear image R1 and the second rear image R2 may be referred to as a first rear overlapped image R12, and an overlapped area between the second rear image R2 and the third rear image R3 may be referred to as a second rear overlapped image R23. The rear image R may preferably be obtained by merging the first to third rear images R1, R2 and R3 in a manner of cutting off a partial area of both end portions of each of the first to third rear images R1, R2 and R3.

In this instance, the first rear overlapped image R12 may be obtained by appropriately merging a left end area of the first rear image R1 and a right end area of the second rear image R2. Similar to this, the second rear overlapped image R23 may be obtained by appropriately merging a left end area of the second rear image R2 and a right end area of the third rear image R3. The thusly-merged first and second rear overlapped images R12 and R23 may then be connected by interpolating into the overlapped areas of the first to third rear images R1, R2 and R3, thereby obtaining the rear image R constructed by images with better image qualities.

In this instance, in FIG. 7C, the front image F may be obtained by merging the first to third front images F1, F2 and F3, starting from a right end area of the first front image F1 to an area of the third front image F3, which corresponds to a left end of the third rear image R3, and the rear image R may be obtained by merging the first to third rear images R1, R2 and R3, starting from an area of the first rear image R1, which corresponds to a right end of the first front image F1, to a left end area of the third rear image R3.

As aforementioned, in case of desiring to obtain an effect of 360°-capturing (or omnidirectional capturing) for the front and rear sides using the pair of optical systems, there is a fundamental limit that the front and rear images should be merged. Therefore, a method of performing omnidirectional capturing at once is proposed in one exemplary embodiment of the present invention, to solve the problem.

Figure 8A:
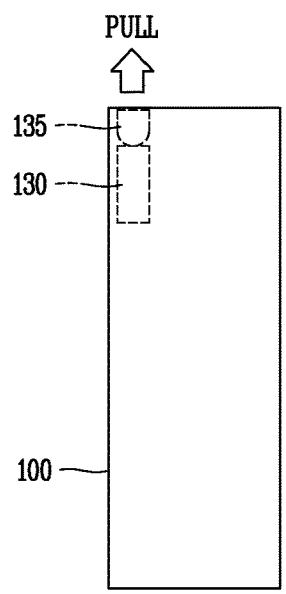
FIG. 8A is a front view of a mobile terminal in a first state in accordance with a first exemplary embodiment of the present invention.
Figure 9A:
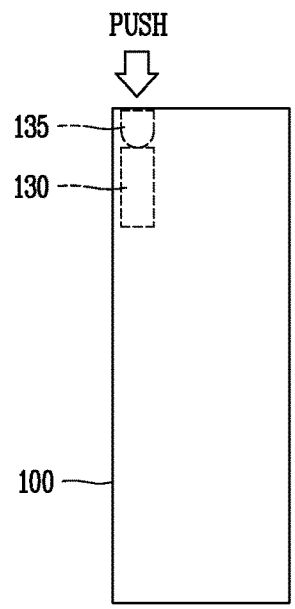
FIG. 9A is a front view of a mobile terminal in a first state in accordance with a second exemplary embodiment of the present invention.
Figure 9B:
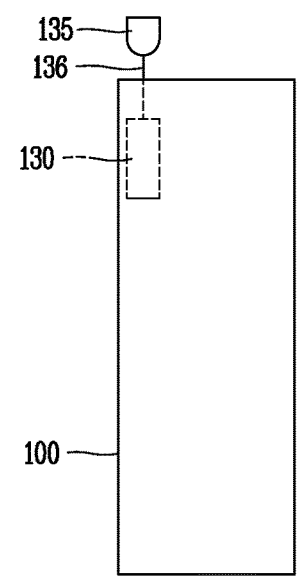
FIG. 9B is a front view of the mobile terminal in a second state in accordance with the second exemplary embodiment of the present invention.
Figure 10A:
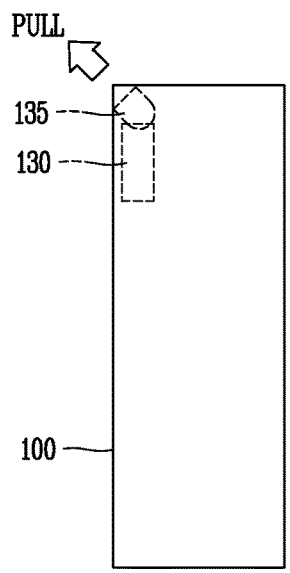
FIG. 10A is a front view of a mobile terminal in a first state in accordance with a third exemplary embodiment of the present invention.
Figure 10B:
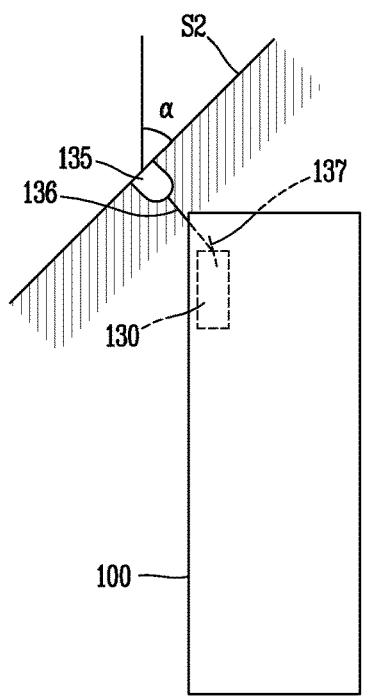
FIG. 10B is a front view of the mobile terminal in a second state in accordance with the third exemplary embodiment of the present invention.
Figure 11A:
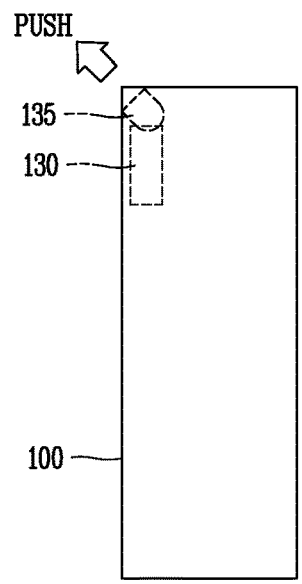
FIG. 11A is a front view of a mobile terminal in a first state in accordance with a fourth exemplary embodiment of the present invention.
Figure 11B:
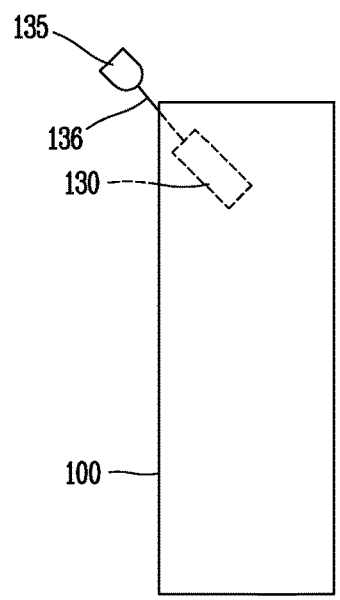
FIG. 11B is a front view of the mobile terminal in a second state in accordance with the fourth exemplary embodiment of the present invention.

FIGS. 8A to 11B are views illustrating a mobile terminal having optical systems supporting omnidirectional capturing in accordance with one exemplary embodiment of the present invention. FIG. 8A is a front view of the mobile terminal in a first state in accordance with a first exemplary embodiment, and FIG. 8B is a front view of the mobile terminal in a second state in accordance with the first exemplary embodiment. FIG. 9A is a front view of the mobile terminal in a first state in accordance with a second exemplary embodiment, and FIG. 9B is a front view of the mobile terminal in a second state in accordance with the second exemplary embodiment. FIG. 10A is a front view of the mobile terminal in a first state in accordance with a third exemplary embodiment, and FIG. 10B is a front view of the mobile terminal in a second state in accordance with the third exemplary embodiment. FIG. 11A is a front view of the mobile terminal in a first state in accordance with a fourth exemplary embodiment, and FIG. 11B is a front view of the mobile terminal in a second state in accordance with the fourth exemplary embodiment.

The mobile terminal 100 in accordance with one exemplary embodiment may include an optical system 130 provided in a terminal body, a rod 136 provided at an upper side of the optical system 130 and pulled out of the terminal body, and a reflecting mirror 135 provided at an end portion of the rod 136 and located at outside with being spaced apart from the terminal body when the rod 136 is pulled out.

The reflecting mirror 135 may reflect light which comes thereto to the optical system 130 in an omnidirectional manner. That is, the reflecting mirror 135 may allow surroundings of the terminal body to be captured in all directions, namely, at 360° by reflecting light of the surroundings toward the optical system 130. In the one exemplary embodiment of the present invention, a state that the reflecting mirror 135 is located in the mobile terminal 100 is referred to as a first state, and a state that the reflecting mirror 135 is pulled out of the mobile terminal is referred to as a second state.

Also, the one exemplary embodiment of the present invention illustrates a manual pull type and a push button type. FIGS. 8A, 8B, 10A and 10B exemplarily illustrate the manual pull type, which will be understood as the same method as the related art digital management broadcasting (DMB) antenna. FIGS. 9A, 9B, 11A and 11B exemplarily illustrate the push button type. The push button type refers to the reflecting mirror 135 being popped out in response to a repulsive force when being pressed. For example, a component, such as a push button or a latch switch may be provided at a lower end of the rod 136. The push button and the latch switch are already widely known in the field to which the present invention belongs, and may be likely to divert the gist of the present invention. Therefore, detailed description thereof will be omitted.

Figure 13:
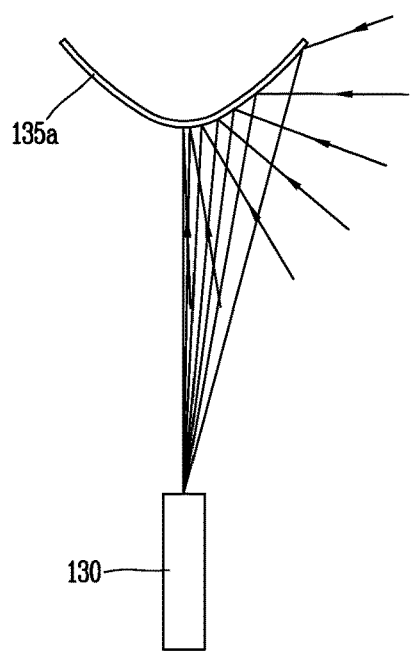
FIGS. 13 and 14 are conceptual views illustrating a flow of light by a reflecting mirror in accordance with one exemplary embodiment of the present invention.
Figure 14:
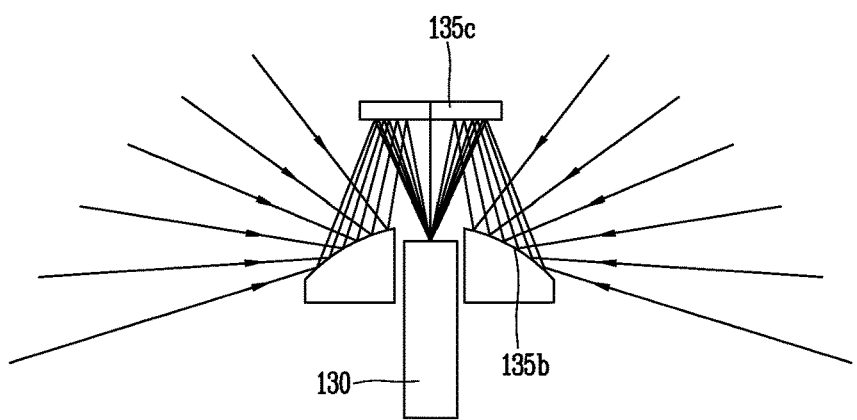

The reflecting mirror 135 is a curved mirror. As one example, the reflecting mirror 135 is a hemispherical mirror, which is convex toward the optical system 130, and is aspheric. Also, the reflecting mirror 135 does not always have to be a convex mirror toward the optical system 130, and may also be a concave mirror. For example, the reflecting mirror 135 may be a mirror in a bugle shape extending from the optical system 130 to the exterior. However, to ensure a wider FOV, a mirror in a convex shape may be preferable. FIGS. 13 and 14 are conceptual views illustrating a flow of light by a reflecting mirror in accordance with one exemplary embodiment. FIG. 13 illustrates an embodiment of employing a reflecting mirror 135a in a convex shape, and FIG. 14 illustrates an embodiment of employing two aspheric reflecting mirrors 135b and 135c.

In this instance, the optical system 130 may be provided therein with the optical systems 130a and 130b arranged at the left and right sides, of the optical systems illustrated in FIG. 2, for example. That is, assuming that an optical system which is arranged at the right side and includes the first to fifth lenses L11, L21, L31, L41 and L51 in FIG. 2 is referred to as a first optical system 130a, and an optical system which is arranged at the right side and includes the first to fifth lenses L12, L22, L32, L42 and L52 is referred to as a second optical system 130b, the optical system 130 illustrated in FIGS. 13 and 14 may be one of the first optical system 130a and the second optical system 130b.

The rod 136 may be an antenna rod, for example, a DMB-embedded antenna. The rod 136 may be integrally formed and have the same diameter, but may be in a multi-stepped form that the diameter is gradually reduced or increased. In this manner, when the rod 136 has the multi-stepped diameter, the rod 136 having predetermined size and volume can be easily accommodated in a limited space.

The reflecting mirror 135 may be disposed to be pulled along an optical axis of the optical system 130, or pulled by being deviated from the optical axis of the optical system 130. An embodiment that the reflecting mirror 135 is pulled along the optical axis of the optical system 130 is illustrated in FIGS. 8B, 9B and 11B, and an embodiment that the reflecting mirror 135 is pulled by being deviated from the optical axis of the optical system 130 is illustrated in FIG. 10B.

Figure 8B:
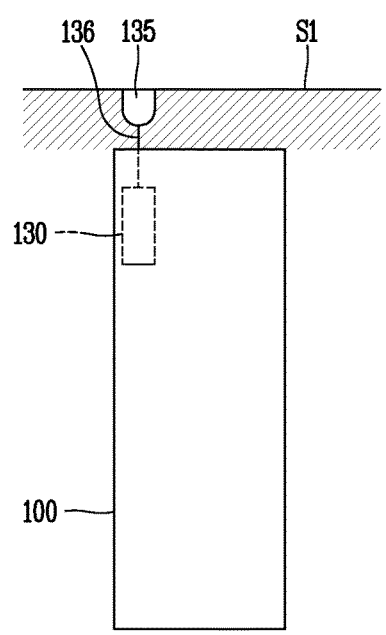
FIG. 8B is a front view of the mobile terminal in a second state in accordance with the first exemplary embodiment of the present invention.

As illustrated in FIGS. 8B, 9B and 11B, the reflecting mirror 135 according to one exemplary embodiment is pulled along a lengthwise direction of the terminal body or in a manner of being upwardly inclined in the lengthwise direction of the terminal body. The optical system 130 may be configured such that the reflecting mirror 135 is provided on the optical axis of the optical system 130 to be pulled along the optical axis of the optical system 130. In this instance, the optical axis of the optical system 130 may be equal to a direction that the rod 136 is formed.

Meanwhile, as illustrated in FIG. 10B, in accordance with one exemplary embodiment, when the reflecting mirror 135 is pulled by being deviated from the optical axis of the optical system 130, a sub reflecting mirror 137 may further be provided between the reflecting mirror 135 and the optical system 130. The sub reflecting mirror 137 may reflect light reflected from the reflecting mirror 135 toward the optical axis of the optical system 130. The sub reflecting mirror 137 may be in a planar, spherical or aspheric shape.

That is, as aforementioned with reference to FIG. 5C, since arranging the optical systems 130a and 130b at the end portion of the mobile terminal rather than the central portion of the mobile terminal 100 is advantageous to ensure the FOV, one exemplary embodiment disclosed herein illustrates a case where the reflecting mirror 135 is pulled right upward along the lengthwise direction of the mobile terminal 100 and a case where the reflecting mirror 135 is pulled to be inclined from the right-upward direction. That is, FIGS. 8A to 9B illustrate the case where the reflecting mirror 135 is pulled right upward, and FIGS. 10A to 11B illustrate the case where the reflecting mirror 135 is pulled to be inclined from the right-upward direction by a predetermined angle α.

In case where the reflecting mirror 135 is pulled inclinedly from the right-upward direction may have an advantage in tilting a capturing angle. This may allow a user to capture images at desired angles (view points) by diversifying the angle that the reflecting mirror 135 is pulled. In this manner, when the reflecting mirror 135 is pulled inclinedly from the lengthwise direction of the terminal body, an area of the mobile terminal 100 which is reflected by the reflecting mirror 135 may be prevented. Therefore, the mobile terminal 100 may be displayed as a small area on a captured image.

As illustrated in FIG. 13, in accordance with one exemplary embodiment disclosed herein, a reflecting mirror 135a may be formed in a hemispherical shape, which is convex toward the optical system 130. Also, as illustrated in FIG. 14, two reflecting mirrors 135b and 135c may be provided. That is, the reflecting mirrors 135b and 135c may include a first reflecting mirror 135b provided closer to the optical system 130 and convex toward outside, and a second reflecting mirror 135c located above the first reflecting mirror 135b in a spaced manner and reflecting an image reflected from the first reflecting mirror 135b to the optical system 130. The first reflecting mirror 135b may have a hemispherical shape which is convex toward outside, and the second reflecting mirror 135c may have a spherical or aspheric shape, or a planar shape. The first reflecting mirror 135b may be provided with a through hole 130d formed through a central portion thereof, and the optical system 130 may be inserted into the through hole 130d.

With the configuration, a background located above the first reflecting mirror 135b may be captured. That is, the optical system 130 illustrated in FIG. 13 may generally be used when desiring to capture a background located below the reflecting mirror 135a (e.g., a lower portion of a line S1 in FIG. 8B), and the optical system 130 illustrated in FIG. 14 may generally be used when desiring to capture a background above the first reflecting mirror 135b (e.g., a lower portion of a line S2 in FIG. 10B).

As illustrated in FIGS. 8A to 11B, during capturing by use of the reflecting mirror 135 which is provided at the outside with being spaced apart from the mobile terminal 100, the optical system 130 may capture an image reflected by the reflecting mirror 135. However, when the FOV of the optical system is excessively wide, even surroundings of the reflecting mirror 135 as well as the image reflected by the reflecting mirror 135 may be reflected. For example, upon using the reflecting mirror 135a illustrated in FIG. 13, even an area out of the reflecting mirror 135a may belong to the wide FOV range of the optical system 130.

To prevent this, in one exemplary embodiment disclosed herein, the FOV of the optical system 130 may be formed to be the same as an angle formed by lines extending from the optical system 130 to contact an outer surface of the reflecting mirror 135. That is, the FOV of the optical system 130 should be the same as the angle formed by lines which extend from the optical system 130 and contact the outer surface of the reflecting mirror 135.

Figure 12A:
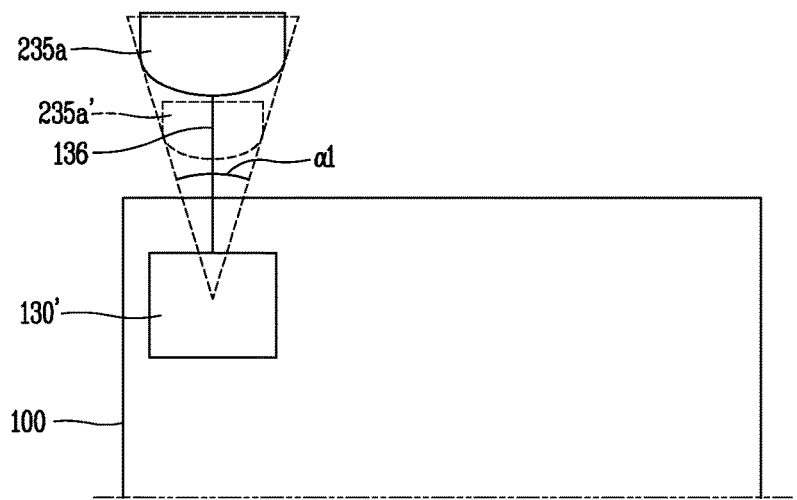
FIGS. 12A and 12B are view of a mobile terminal having different reflecting mirrors in accordance with one exemplary embodiment of the present invention.
Figure 12B:
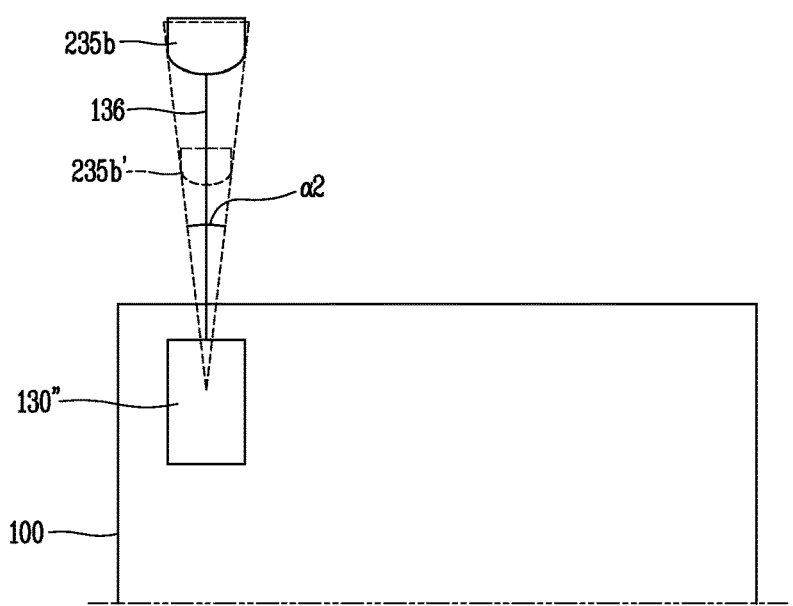

FIGS. 12A and 12B illustrate a mobile terminal having different reflecting mirrors in accordance with one exemplary embodiment of the present invention. FIG. 12A illustrates position and size of a reflecting mirror 235a in case of employing an optical system 130' with a wide FOV, and FIG. 12B illustrates position and size of a reflecting mirror 235b in case of employing an optical system 130" with a narrow FOV.

First, referring to FIG. 12A, for the optical system 130' with the wide FOV α1, the FOV α1 should be the same as an angle formed by lines extending from the optical system 130' to contact an outer surface of the reflecting mirror 235a, and the size of the reflecting mirror 235a should increase as the reflecting mirror 235a is getting away from the optical system 130'. Therefore, to uniformly maintain the FOV α1, the size of the reflecting mirror 235a and a distance from the optical system 130' to the reflecting mirror 235a should be adjusted. If the distance between a reflecting mirror 235a' and the optical system 130' is excessively reduced in order to reduce the size of the reflecting mirror 235a', the mobile terminal 100 may excessively be included in a reflection area of the reflecting mirror 235a', which opposes the objective to capture surroundings. Therefore, the size of the reflecting mirror 235a and the spaced position between the reflecting mirror 235a and the optical system 130' may appropriately be varied in relation to the FOV α1 of the optical system 130'.

Referring to FIG. 12B, for the optical system 130" with the narrow FOV α2, the FOV α2 should be the same as an angle formed by lines extending from the optical system 130" to contact an outer surface of the reflecting mirror 235b, and the size of the reflecting mirror 235b should increase as the reflecting mirror 235b is getting away from the optical system 130". Therefore, the size of the reflecting mirror 235b and the distance of the reflecting mirror 235b from the optical system 130" can be adjusted, with uniformly maintaining the FOV α2. However, if the distance between the reflecting mirror 235b' and the optical system 130" is excessively reduced to reduce the size of the reflecting mirror 235b', similar to FIG. 12A, the mobile terminal 100 may excessively occupy the reflection area of the reflecting mirror 235b'. Therefore, the size and position of the reflecting mirror 235b should appropriately be adjusted in relation to the FOV α2 of the optical system 130'.

In this instance, in one exemplary embodiment disclosed herein, a general camera mode may be activated in the first state that the reflecting mirror 135 is located in the terminal body, and the general camera mode may automatically be switched into an omnidirectional capturing mode in the second state that the reflecting mirror 135 is pulled out of the terminal body.

Meanwhile, a camera application installed in the mobile terminal 100 may be executed in the general camera mode in the first state, while executed in the omnidirectional capturing mode in the second state.

Figure 15A:
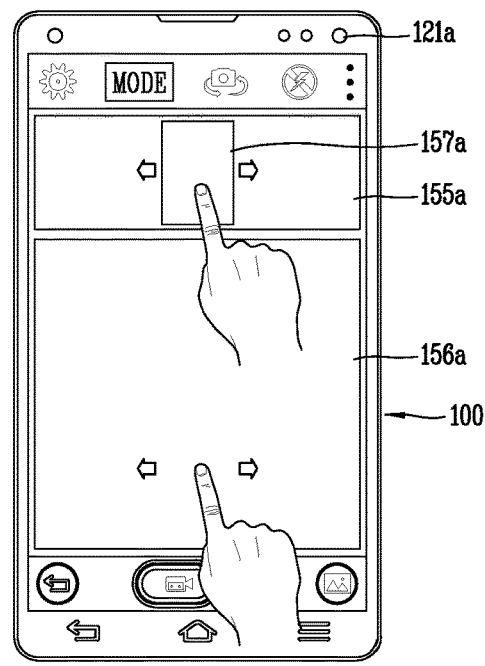
FIGS. 15A and 15B are exemplary views illustrating a use of an omnidirectional capturing mode in accordance with one exemplary embodiment of the present invention.
Figure 15B:
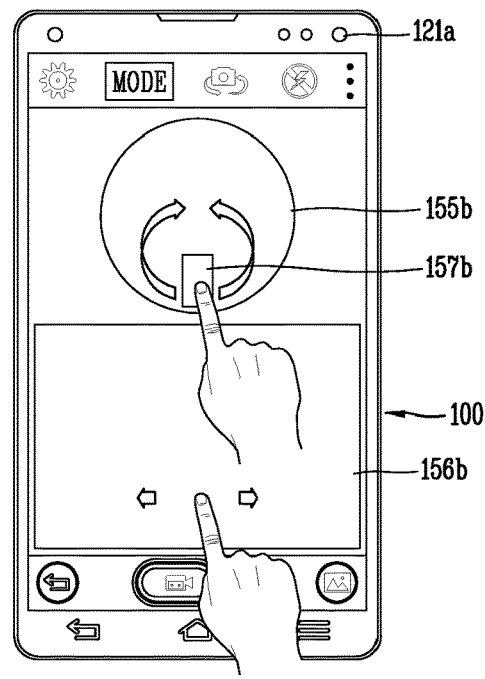

FIGS. 15A and 15B are exemplary views of an omnidirectional capturing mode in accordance with one exemplary embodiment disclosed herein, which includes not only captured images by the optical systems illustrated in FIGS. 8A to 11B but also captured images by the optical systems illustrated in FIGS. 4A to 7C.

As illustrated in FIGS. 15A and 15B, when the reflecting mirror 135 is pulled out of the mobile terminal 100, the camera application may automatically be activated in the omnidirectional capturing mode, and the display unit of the mobile terminal 100 may be divided into a first display 155a, 155b and a second display 156a, 156b. FIG. 15A exemplarily illustrates that an image obtained by capturing a front side around a user is output on the first display 155a, and a predetermined area of the first display 155a is output on the second display 156a in an enlarging manner. In this instance, the first display unit 155a may be formed long in a horizontal direction, like a screen in a panorama mode, and an area that the user desires to enlarge may be distinguished from the other area by a guide 157a. The guide 157a may be output in a shape of a rectangular box.

Also, referring to FIG. 15B, the first display 155b which outputs a captured image of a front side may be output in a form of a spherical view or a planar view, and thus the user can view a specific area with turning the first display 155b. Even in this instance, an area that the user desires to enlarge may be distinguished from the other area of the first display 155b by a guide 157b.

In this instance, screen information output on the second display 156b may be screen information that a distorted screen has been compensated for by the aforementioned method (see FIGS. 7A to 7C).

When the reflecting mirror 135 is inserted back into the mobile terminal 100 so as to be switched into the first state, the general camera mode may be activated again, and the camera application may be executed in the general camera mode when it is executed in the first state.

Figure 16A:
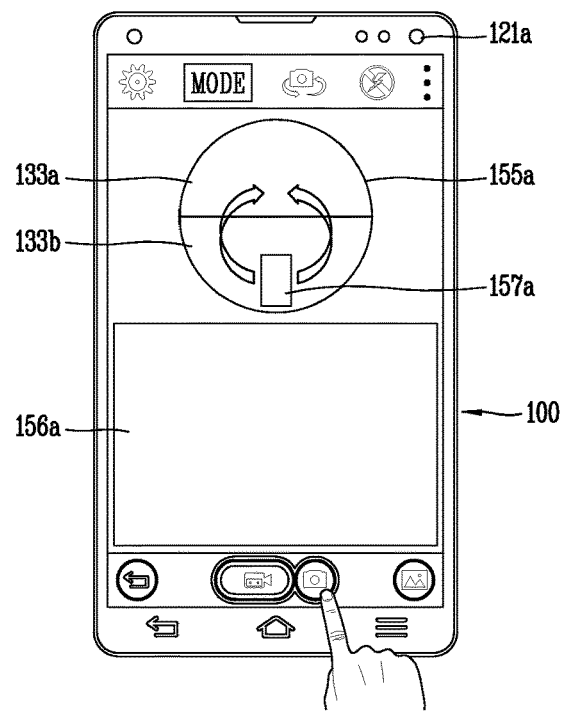
FIGS. 16A and 16B are exemplary views illustrating a method of capturing a photo (image) in a general camera mode during capturing in an omnidirectional capturing mode in accordance with one exemplary embodiment of the present invention.
Figure 16B:
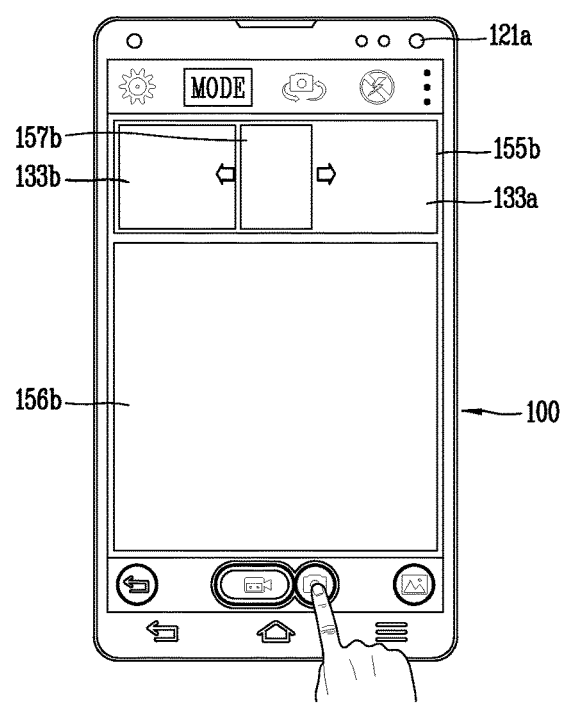

FIGS. 16A and 16B are exemplary views illustrating a method of capturing a snap shot in the general camera module while capturing an image in the omnidirectional capturing mode in accordance with one exemplary embodiment disclosed herein, which includes not only captured images by the optical systems illustrated in FIGS. 8A to 11B but also captured images by the optical systems illustrated in FIGS. 4A to 7C.

As illustrated in FIGS. 16A and 16B, when desiring to take a snap shot while capturing a video in the omnidirectional capturing mode, the front image 133a captured by the front camera (or the first optical system 130a) and the rear image 133b captured by the rear camera (or the second optical system 130b) may be output on the first display 155a, 155b. In this instance, one of the front image 133a and the rear image 133b may be output or both of the front images 133a and the rear image 133b may be output in a manner of dividing an area. A preview image of a specific area indicated by the guide 157a, 157b, of an output area of the first display unit 155a, may be output on the second display 156a, 156b in an enlarging manner.

In this instance, when the front image 133a and the rear image 133b are simultaneously output on the first display 155a, 156b, as illustrated in FIGS. 15A and 15B, a screen may be output long in one direction, like a screen in the panorama mode, or a spherical screen may be output to give stereoscopic feeling. FIG. 16A illustrates the latter, and FIG. 16B illustrates the former.

Even in this instance, a partial area of a screen that the user desires to capture may be selected by moving the guide 157a, 157b output on the first display 155a, 155b. FIG. 16A illustrates the front image 133a output at an upper side of the first display unit 155a and the rear image 133b output at a lower side of the first display unit 155a, and FIG. 16B illustrates the front image 133a output at a right side of the first display 155b and the rear image 133b output at a left side of the first display 155b. However, the present invention may not be limited to this.

There may be a case of using the optical system 130 according to one exemplary embodiment in a mounting manner. For example, the optical system 130 may be used like a wearable device, by attaching to a user's wrist or the like while the user rides a bicycle. In this instance, a shadow may inevitably be generated.

Specifically, when desiring to perform omnidirectional capturing using a pair of optical systems 130a and 130b each having an FOV over 180° in accordance with one exemplary embodiment disclosed herein, the FOV of one of the optical systems 130a and 130b may be partially obscured due to a contact with a human body (the user's body), thereby generating a shadow. In this instance, there is no need to activate both of the first optical system 130a and the second optical system 130b, and thus an optical system which is located at a shadow-generated area, of the first and second optical systems 130a and 130b, may automatically be turned off. For example, when the user captures surroundings with wearing the mobile terminal 100 illustrated in FIG. 4 on his wrist during exercise, a shadow area may be generated at the second optical system 130b by the user's body (wrist). Accordingly, the capturing with the second optical system 130b is made inconvenient. In this instance, the second optical system 130b may automatically be turned off. This may result in preventing an unnecessary power supply.

To this end, in one exemplary embodiment disclosed herein, if it is recognized by a laser sensor (not illustrated) provided in a rear surface of the mobile terminal 100 that the second optical system 130b is located adjacent to the user's body, the second optical system 130b may be turned off and only the first optical system 130a may operate. Also, if it is recognized by a proximity light sensor (141, 142, see FIG. 1B) provided in a front surface of the mobile terminal 100 that the first optical system 130a is located adjacent to the user's body, the first optical system 130a may be turned off and only the second optical system 130b may operate. In this manner, the shadows formed at the first optical system 130a and the second optical system 130b may be sensed by the proximity light sensor and the laser sensor provided in the mobile terminal 100.

In one exemplary embodiment disclosed herein, a mounted direction of the mobile terminal 100 may also be recognized by a gyro sensor (not illustrated) provided in the mobile terminal 100, and accordingly one of the first and second optical sensors 130a and 130b may be turned off. For example, if the gyro sensor senses that the mobile terminal 100 is inclined in a direction that the first optical system 130a is located, the capturing by the first optical system 130a may not be required. Therefore, the first optical system 130a may be turned off and only the second optical system 130b may be turned on to capture an image.

Also, in one exemplary embodiment disclosed herein, a moving direction of the mobile terminal 100 may be sensed by an acceleration sensor installed in the mobile terminal 100, and accordingly one of the first and second optical systems 130a and 130b may be turned off. For example, when desiring to capture only a front side in a vehicle running forward, the forward movement of the mobile terminal 100 may be recognized by the acceleration sensor, and thus capturing a background using the second optical system 130b may be prevented. Of course, even in this instance, if desiring to perform capturing using both of the first and second optical systems 130a and 130b, such operation mode may be released.

In one exemplary embodiment disclosed herein, brightness may be determined by a color sensor (not illustrated) installed in the mobile terminal 100, so as to turn on/off a flash 124 (see FIG. 1C). For example, the flash 24 may be turned on when nighttime is sensed by the color sensor, and turned off when daytime is sensed by the color sensor. In addition, brightness of the flash 124 may be adjustable.

A general camera module may be provided with a laser diode or a photo diode for measuring a distance up to a subject to be captured, and the distance up to the subject may be measured by a laser sensor. However, the distance measurement may be difficult at the nighttime due to dark surroundings. To solve this problem, brightness of the flash should be adjusted according to darkness. In one exemplary embodiment disclosed herein, the brightness of the flash may be sensed by the laser diode or the photo diode, and brightness of the flash may be adjusted to enable a smooth distance measurement.

In one exemplary embodiment disclosed herein, the omnidirectional capturing mode may be controlled in a remote control manner by cooperating with a wearable device, such as a smart watch. The smart watch may carry out an ON/Off of the omnidirectional capturing mode, recording, reproduction of a recorded file, WiFi connection and the like.

The aforementioned present invention can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body;
an optical system located in the terminal body and being configured to omnidirectionally capture surroundings of the terminal body,
wherein the optical system comprises a first optical system capturing light received from a first direction, and a second optical system capturing light received from a second direction opposite to the first direction, wherein the first optical system and the second optical systems each have a field of view (FOV) over 180°, and
wherein the omnidirectional capturing is performed by merging a first image captured by the first optical system and a second image captured by the second optical system;
a first display configured to display the first image and the second image; and
a second display configured to output a partial area of what is displayed at the first display in an enlarged manner, the partial area being indicated by a guide.

2. The mobile terminal of claim 1, wherein the first and second optical systems have a symmetric structure in which a first optical axis of the first optical system and a second optical axis of the second optical system are aligned, or an asymmetric structure in which the first optical axis and the second optical axis are not aligned with each other.

3. The mobile terminal of claim 2, wherein the first and second optical systems are arranged in the symmetric structure,
wherein the mobile terminal further comprises:
a rotatable curved mirror located between the first optical system and the second optical system; and
an image sensor located at least at one of an upper portion or a lower portion of the curved mirror.

4. The mobile terminal of claim 2, wherein the first optical system and the second optical system are located at different sides of the terminal body.

5. The mobile terminal of claim 2, wherein the merging of the first image and the second image comprises performing an optical axis alignment for the first image and the second images by moving the first image and the second image toward a third axis by predetermined distances,
wherein the third axis corresponds to a middle point between the first optical axis and the second optical axis when the first optical system and the second optical system are arranged in the asymmetric structure.

6. The mobile terminal of claim 5, wherein partial areas of both end portions of the first image and the second image are omitted, the partial areas approaching the third axis due to image movement during the optical axis alignment.

7. The mobile terminal of claim 2, wherein the first image and the second image are merged by combining a plurality of first sub images and second sub images captured in a panorama mode, and
wherein at least a partial area of overlapped areas between the plurality of first and second sub images is generated by merging overlapped areas between the adjacent sub images.

8. The mobile terminal of claim 1, wherein snap shot capturing is performed while previewing the partial area displayed on the second display.

9. The mobile terminal of claim 1, further comprising:
at least one of a proximity light sensor, a laser sensor, a gyro sensor, or an acceleration sensor, configured to sense a mounted or moving direction of the terminal body, so as to block a power supply to one of the first optical system or the second optical system.

10. The mobile terminal of claim 1, further comprising:
a color sensor sensing brightness around the terminal body to adjust brightness of a flash, or to activate or not activate the flash.

* * * * *